United States Patent
Mandel et al.

(10) Patent No.: US 9,369,768 B1
(45) Date of Patent: Jun. 14, 2016

(54) SYSTEM AND METHOD FOR MEDIA PRESENTATION WITH DYNAMIC SECONDARY CONTENT

(71) Applicant: NBCUniversal Media, LLC, New York, NY (US)

(72) Inventors: Bill Mandel, Universal City, CA (US); Erica Marie Dionne, Universal City, CA (US)

(73) Assignee: NBCUNIVERSAL MEDIA, LLC

( * ) Notice: Subject to any disclaimer, the term of this patent is extended or adjusted under 35 U.S.C. 154(b) by 0 days.

(21) Appl. No.: 14/635,839

(22) Filed: Mar. 2, 2015

(51) Int. Cl.
| | |
|---|---|
| H04N 7/10 | (2006.01) |
| H04N 21/472 | (2011.01) |
| H04L 29/06 | (2006.01) |
| H04N 21/44 | (2011.01) |
| H04N 21/4788 | (2011.01) |

(52) U.S. Cl.
CPC ...... H04N 21/47205 (2013.01); H04L 65/4069 (2013.01); H04N 21/44016 (2013.01); H04N 21/4788 (2013.01)

(58) Field of Classification Search
CPC .......... H04N 21/47205; H04N 21/44016; H04N 21/4788; H04L 65/4069
See application file for complete search history.

(56) References Cited

U.S. PATENT DOCUMENTS

| | | | | |
|---|---|---|---|---|
| 6,081,830 A | * | 6/2000 | Schindler | H04L 29/06 348/552 |
| 6,519,771 B1 | * | 2/2003 | Zenith | H04N 5/4401 348/E5.108 |
| 6,754,904 B1 | * | 6/2004 | Cooper | G06Q 10/10 348/E7.071 |
| 9,213,403 B1 | * | 12/2015 | Raffle | G06F 3/011 |
| 2004/0098754 A1 | * | 5/2004 | Vella | H04N 5/445 725/135 |

* cited by examiner

*Primary Examiner* — Oleg Asanbayev
(74) *Attorney, Agent, or Firm* — Lee, Hong, Degerman, Kang & Waimey PC; Jonathan Kang; Justin D. Lee

(57) ABSTRACT

A method for presenting media with dynamic content to a first user includes obtaining information related to a current playback position on a playback timeline being presented to the first user, obtaining secondary content related to the media and associated with a second user, wherein the first user and second user are associated according to a third party database, storing the obtained secondary content in a memory, and generating and transmitting instructions for displaying a first indicator of the secondary content at a first position on the playback timeline to the first user, wherein the first position corresponds to a first timestamp associated with the secondary content.

21 Claims, 10 Drawing Sheets

SYSTEM AND METHOD FOR MEDIA PRESENTATION WITH DYNAMIC SECONDARY CONTENT

With the advancement of communication networks and media compression technologies, content providers have been provided with the ability to stream media content to end users via communication networks such as the Internet. By streaming media content directly to home entertainment systems or personal and portable devices, end users are also provided with an extremely quick and convenient mode for consuming media content, by browsing and selecting from vast collections which are immediately available.

In addition to convenience, streaming media content provides a content provider with the ability to detect, track, and record the viewing history and habits of end users. However, while the connected nature of streaming media allows content providers to collect such viewing data for a significant number of end users, this collected data provides no enhanced viewing experience for the end user, other than simply showing a viewing history or where the end user previously left off. Additionally, while a significant number of end users may be connected to the content provider during the streaming process, the end users themselves are provided with no mode of connecting with each other, even where two end users are watching the same content at the same time.

The ability for a content provider to detect, collect, store, and distribute information related to end users' viewing of a particular media content when the same media content is viewed by a particular end user may be advantageous to provide an enhanced viewing experience. Thus, there is a great need for a solution to effectively present media content with dynamic secondary content which may be relevant to the end user.

SUMMARY

Embodiments of the present disclosure may include providing media content for consumption by an end user along with a presentation of dynamic secondary content which may be relevant to the end user. The dynamic secondary content may include content from social media applications where the content is associated with other users and related to the media content being presented. In some embodiments, the secondary content may be generated by the other users, and the secondary content may be generated simultaneously with the end user's consumption of the media content, or it may be generated time-independent from the end user's consumption. In some embodiments, only secondary content associated with another user that is connected to the end user via the social media application is presented to the end user.

Embodiments of the present disclosure include providing the media for display to a first user, providing information for displaying a current playback position on a playback timeline to the first user, obtaining secondary content related to the media and associated with a second user, wherein the first user and second user are associated according to a third party database, storing the obtained secondary content in a memory, and generating and transmitting instructions for displaying a first indicator of the secondary content at a first position on the playback timeline to the first user, wherein the first position corresponds to a first timestamp associated with the secondary content.

Embodiments of the present disclosure also include receiving a selection input selecting the displayed first indicator and generating and transmitting instructions for displaying the secondary content associated with the displayed first indicator.

Embodiments of the present disclosure also include obtaining additional secondary content related to the media and associated with a third user, wherein the first user and third user are associated according to the third party database, storing the additional secondary content in a memory, and generating and transmitting instructions for increasing a size of the first indicator when a difference between the first timestamp and a second timestamp associated with the additional secondary content is less than or equal to a threshold length of time.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for presenting media content with related and dynamic secondary content.

Figure 1:
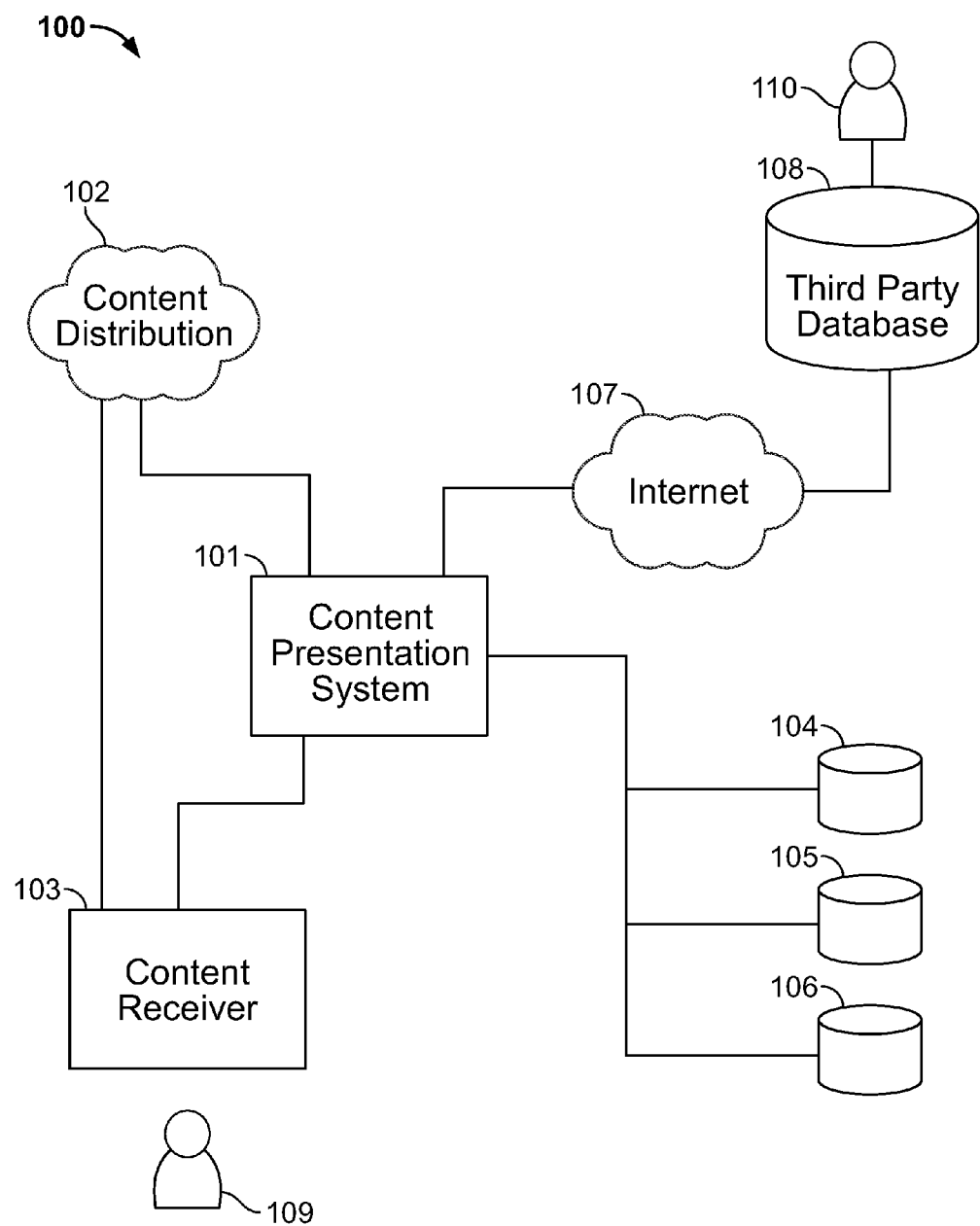
FIG. 1 is an illustration of a networked environment according to an embodiment of the present invention.

Referring now to FIG. 1, an example of a networked system 100 according to an embodiment of the present invention is depicted. The system 100 may include a content presentation system 101 connected to a content distribution system 102. The content distribution system 102 may include various systems for distribution of content including over-the-air, cable, internet, other network connection systems, and the like, which implement networks and hardware known and used in the related art, including broadcast technologies, cable or satellite content distribution systems, internet protocol (IP), LAN, or other networked technologies, and the like, wherein examples of the distributed content include live and recorded television, movies, online content, music, radio or other audio-visual content, and the like. The content presentation system 101 may be connected to the content distribution system 101 via a network, such as the internet, may receive content wirelessly via satellite transmission, broadcast, or the like, or may be connected, for example via cable to a content provider or cable head-end of a multiple-system operator.

In some embodiments, the content presentation system 101 is configured to receive information of media content and provide said media content to a content receiver 103 for consumption by an end user 109. In other embodiments, the content receiver 103 receives the media content directly from the content distribution system 102 for consumption by the end user 109. In these embodiments, the media content may be distributed to the content receiver 103 from the content distribution system 102 via the same various systems for distribution of content as discussed above with respect to the content presentation system 101. The content presentation system 101 and the content distribution system 102 may communicate information regarding the media content being provided to content receiver 103 in order to synchronize the presentation of all content to the user 109. For example, where media content is provided to the content receiver 103 by the content distribution system 102, the content distribution system 102 may provide the content presentation system 101 with information such as a timecode reference, indicating a current timecode position of the media content being presented. The content presentation system 101 may accordingly be configured to receive the timecode reference signals and coordinate presentation of secondary content (discussed further below) based on the timecode reference signals.

The content receiver 103, otherwise referred to as a client, may include various hardware and systems for receiving and presenting media content, including televisions, television receivers, set top boxes, internet content receivers, desktop computers, laptop computers, tablet computers, smartphones, additional media consumption devices, and the like. The content receiver 103 may be configured to execute various applications such as a browser and the like. The browser may be executed in a client, for example, to access and render network pages, such as web pages, or other content provided by the content presentation system 101 and/or other servers in which a content receiving user interface may be rendered. The client may be configured to execute applications beyond a browser, such as for example, email applications, messaging applications, social media applications, and the like. Accordingly, in some embodiments, a user can manipulate a user interface presented in the form of network pages shown in a display device via the browser or other application that causes interaction with the content presentation system, or other aspects of the networked system 100.

In other contemplated embodiments (not depicted), the media content may be obtained from a local source such as a physical storage medium, for example including DVD's, Blu-ray discs, CD's, hard drives, integrated flash memory, removable flash memory, and the like. The client may be configured to reproduce the media content read from such storage medium via a media playback application or program while being connected to the content presentation system 101. The client may transmit information to the content presentation system 101 such as an identifier of the media content being reproduced at the client from the local storage medium. While not depicted in FIG. 1, one of ordinary skill in the art will recognize that the same functionality of various embodiments as discussed herein are contemplated with respect to this configuration.

Referring back to FIG. 1, the content presentation system 101 may be connected to the content receiver 103 via any of the communication systems and networks previously discussed with respect to the content distribution system 102. It should also be appreciated that embodiments of the disclosure can be implemented in various ways. The networked environment shown in FIG. 1 includes a client or content receiver 103 in communication with the content presentation system 101 and optionally with the content distribution system 102, and the content receiver 103 may be connected via a network (not depicted). The network includes, for example, the internet, intranets, extranets, wide area networks (WANs), local area networks (LANs), wired networks, wireless networks, or other suitable networks and the like, or any combination of two or more such networks.

The content presentation system 101 may comprise, for example, a server computer or any other system providing computing capability. Alternatively, a plurality of computing devices may be employed that are arranged, for example, in one or more server banks or computer banks or other arrangements. For example, a plurality of content presentation systems together may comprise a cloud computing resource, a grid computing resource, and/or any other distributed computing arrangement. Such content presentation systems may be located in a single installation or may be distributed among many different geographical locations. For purposes of convenience, the content presentation system is referred to herein in the singular. Even though the content presentation system is referred to in the singular, it is understood that a plurality of content presentation systems may be employed in the various arrangements as described above.

Also, the content presentation system 101 may include at least one data store, which may comprise data and applications operable to provide access to the data store stored therein. It should be appreciated that the data store may or may not reside within a computing device of the content presentation system, but may be accessible via a network. The data store can include user data, which can store information about users of the content receiver or the system. User data can include, for example, a user profile including demographic information about a user, address, telephone number, payment information, email address, viewing or purchasing history, browsing history, affiliation information, and other data related to users. User data may also include information from one or more third party systems with which the user is associated, for example social media application frameworks. In one embodiment, a user of the content presentation system may link one or more third party social media application accounts with an account of the user stored at the content presentation system, which can allow the content receiver to access content associated with the user from the social media application framework, as well as publish information to the social media application framework, as will be discussed further herein.

In addition to providing media content, the content presentation system 101 may be configured to provide the content receiver 103 with information related to the media content, including programming information, guide information, channel information, content metadata information, and the like. Specifically, the content presentation system 101 may provide information to enable the content receiver 103 to present a user interface including information regarding the media content, programming, materials related to the media content, and the like. Accordingly, the content receiver 103 may be configured to receive such interface information and present a user interface to the user 109 on a display, such as a television display, computer display, tablet computer display, smartphone display, and the like. In some embodiments, the interface information may be provided to the content receiver 103 in a standard format such that any content receiver 103 is capable of receiving and presenting the interface information.

For example, the interface information may be provided in HTML format such that the content receiver 103 may receive and present the interface via an HTML enabled program or application, such as a web browser. In other embodiments, the content receiver 103 may be configured to receive the interface information and present the interface in a specific manner according to an interface format preprogrammed at the content receiver 103. For example, the interface information may be provided by the content presentation system 101 in a data format without interface formatting defined, such as an XML format. Those of ordinary skill in the art will recognize that these examples are not limiting, and that various configurations and implementations are available and considered by this disclosure.

The interface displayed to the user 109 may enable the user to select certain available programming, play media content, pause media content, record media content, schedule recording of media content, and the like. The interface may be configured to receive inputs from the user via an input device, such as a remote control, keyboard, mouse, touchscreen, and the like, or connected devices such as smartphones, tablet computers, laptop computers, and the like to perform functions of the interface. The connected devices may be connected via a wired connection or connected via wireless connection, such as WiFi, Bluetooth, near-field communication (NFC), and the like. Additionally, the interface presented by the content receiver 103 may be configured to allow the user 109 to view materials and content related to the media content, referred to herein as "secondary content." The secondary content may include additional audio, video, images, or text content related to the media content being viewed by the user, such as behind the scenes clips, director commentary, captioning, alternate languages, deleted scenes, alternate scenes, character information, actor biography information, and the like.

In some embodiments, the secondary content may be provided by the content distribution system 102 along with the media content. In such configurations, the system 100 may include secondary content databases within the content distribution system 102 (not depicted) for storing and providing the secondary content related to the media content to be presented to the user 109. In other embodiments, the secondary content may be provided to the content presentation system 101 separately from the content distribution system 102 for providing to the content receiver 103. Particularly, secondary content may be stored in secondary content databases 104, 105, 106 and provided to the content presentation system 101. The number of secondary content databases depicted in the figures is solely by way of example, and one of ordinary skill in the art will understand that the secondary content databases may include less than three, or more than three databases. The secondary content databases 104, 105, 106 may be connected and operated by a database server which receives an identifier of media content from the content presentation system 101 and retrieves related secondary content from the secondary content databases for providing to the content presentation system 101. Alternatively, the content presentation system 101 may determine identifiers of the secondary content to be presented to the user related to the media content and transmit a query to the server computer to provide the identified secondary content from the secondary content databases 104, 105, 106.

In certain embodiments, the secondary content databases 104, 105, 106 may each be configured to store particular types of secondary content. For example, secondary content database 104 may be configured to store deleted scenes, database 105 may be configured to store actor information, and database 106 may be configured to store background information on locations and landscapes. In these embodiments, the secondary content may be stored in the databases 104, 105, 106 for use in connection with multiple and various media content. For example, the same secondary content clip stored in database 105 discussing a particular actor may be used for presentation of two separate media content, where the same particular actor appears in both media content.

Secondary content databases 104, 105, 106 may be implemented in the same hardware computer system as content presentation system 101, connected to the content presentation system 101 via a network, or otherwise communicatively coupled by various networked computer systems such that the content presentation system 101 is capable of indexing, querying, receiving, and transmitting information to and from the secondary content databases. In some embodiments (not depicted), the secondary content databases 104, 105, 106 may be networked via a communication system or network such as the internet 107, and in some embodiments content receiver 103 may be configured to receive information directly from said content databases (not depicted). In some embodiments, the secondary content may be stored in a single database for each media content, or a single database corresponding to a particular content distributor or content provider.

In an embodiment, the secondary content may also include content received from external or third party sources, which is related to the media content presented to the user 109. An example of this type of secondary content is information received from social media application sources, such as FACEBOOK, TWITTER, INSTAGRAM, and the like. Secondary content stored in databases related to social media applications may be related to the media content based on a certain keyword or metadata tag associated with the secondary content, or the secondary content may have been created or entered into the social media database via an interface related to the media content (as will be discussed below in further detail).

For the purposes of background information, social media applications allow users to form connections with other users of the same application for sharing information, including two-way connections in which each user validates or approves the connection with the other, or one-way connections in which a first user requests a subscription to the content entered by a second user, where the subscription request is automatically approved in some cases without action from the second user or in other cases where the second user must provide approval of the subscription request from the first user. Such connections allow a particular user to generate and upload content to one or more third party databases (including social media databases) 108 which is then provided and made available to each user to whom the particular user shares a connection. In other cases, a user of a social media application may choose to leave his or her generated content "public," or in other words available to the general public such that the user's social media content is viewable by anyone, regardless of whether the user is connected to a viewing user via the social media framework.

Thus, in some embodiments of the system 100, content presentation system 101 may be connected to a third party database 108 or via or by a corresponding third party system including server computers and various networks (not depicted, and collectively referred to herein for convenience as "third party database"), such as a social media application framework configured to store and provide social media content generated by the social media application. The content presentation system 101 may be connected to the third party database 108 via a network, such as the internet 107. The content presentation system 101 may be configured to access, receive, transmit, or upload information to and from the third party database 108 using a specific application programming interface (API) provided by the third party, such as an application specific API provided by FACEBOOK, TWITTER, INSTAGRAM, and the like. In some embodiments (not depicted), the content receiver 103 may be configured to communicate with third party database 108 via the corresponding API. In yet other embodiments, the content presentation system 101 may be connected to the third party database 108 via other communication means such as a LAN or an intranet, or the content presentation system 101 and the third party database 108 may be otherwise implemented or co-located in a unified hardware configuration or location such that a network connection such as the Internet 107 is not required. Accordingly, while FIG. 1 includes a description of 108 as associated with a third party, the depicted embodiment is for example only, and various configurations and embodiments are considered wherein the database of 108 and the content presentation of 101 are implemented by a single party.

Using said API or other tools, the content presentation system 101 may receive information related to the user's 109 various connections within a social media application framework, in addition to social media content which the user 109 has access to within the social media application which may be related to the media content being presented to the user. The API can, subject to authorization of a user, expose various functionality of a social media application framework to applications using the API, such as access to information about users, their connected users, biographical or "profile" information, images, videos, and the like. In this way, the content presentation system 101 may, via the connection to the third party database and the API, publish content and/or retrieve content to and from the third party database 108 and subsequently generate and provide instructions for displaying the content at the content receiver 103, as will be described further herein.

In such embodiments, the content receiver 103 may be configured to receive inputs for authentication information of the user 109 for each social media database 108 accessed by the content presentation system 101. Accordingly, the content receiver 103 may present an interface to the user to provide a user identifier and user password for each identified social media application in order to authenticate the content presentation system 101 for access to the social media database 108. Using an identifier of the user, the content presentation system 101 may receive all connection information of the user 109, in addition to any social media content available to the user via any connections which may be related to the media content being presented to the user. As previously discussed, the authentication information of the user for third party systems, may be stored in a data store of the content presentation system 101, or stored in another memory or data store, and be associated with the account information of the user.

For example, using an identifier of the user 109 and an identifier of the media content being presented to the user, the content presentation system 101 may retrieve social media content generated by connected another user 110, where the social media content is related to the identifier of the media content. The content presentation system 101 may be configured to then present the received social media content associated with user 110 to the user 109 in a graphical user interface along with the media content, which will be discussed in further detail herein. The content presentation system 101 may be further configured to present the social media content alongside or within the presented media content according to a specific time, region, language, color, appearance, volume, or other presentation characteristic during the presentation of the media content according to certain data contained in or a certain characteristic of the social media content.

Figure 2:
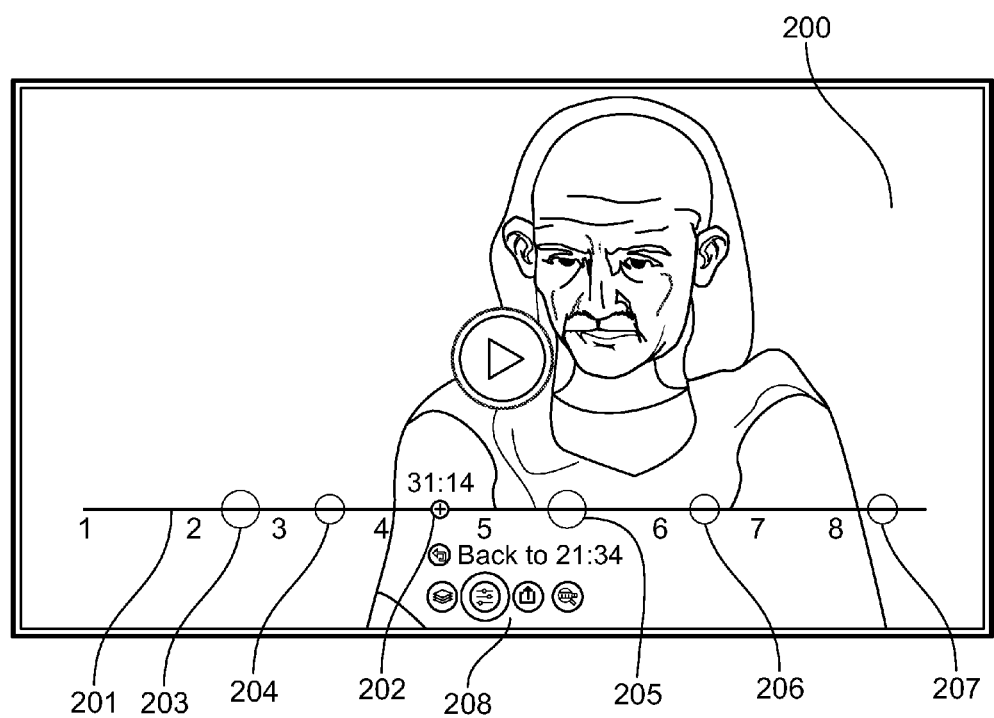
FIG. 2 is an illustration of a user interface for presenting media content in a networked environment according to an embodiment of the present invention.

Turning now to FIG. 2, an illustration of an example of a user interface for presenting media content rendered by a client according to an embodiment of the present disclosure is depicted. The content presentation system 101 may receive media content 200 to be presented to the user, in most cases in response to a user's selection of the media content for viewing from a selectable list of available content. During the presentation of the media content, a playback timeline 201 and a current playback indicator 202 may be displayed to indicate the total time elapsed and remaining in the media content, and the current position of the playback within the media content. In addition to these interface elements, the content presentation system 101 may further be configured to provide information on secondary content related to the media content, as previously discussed. It is considered that the "timeline," though depicted in FIG. 2 as being temporal, need not necessarily be an indicator of positions of content segments relative to the timecode or time stamps in which they appear in the media content. For example, in one embodiment the timeline is a series of segments to be played in a certain order where the ordering is based on relevance in response to a search query, with the most relevant segment played first, followed by the next-most-relevant. Other embodiments are considered where the segments of the timeline are presented based on an ordering determined on a specific criteria, either in response to an action or input by the user 109, factors based on the circumstances in which the media content is viewed such as time of day, personal data relevant to the user 109, other media content recently viewed, and the like.

In some embodiments, secondary content indicators 203-207 may be displayed on the playback timeline to provide a visual indication on the existence of related secondary content. As previously discussed, the secondary content may include audio, video, or text information related to the media content, such as behind the scenes, deleted scenes, commentary, social media content, and the like. The secondary content indicators 203-207 may be displayed at various positions along the playback timeline such that each indicator is centered about a time point corresponding to a timestamp associated with the secondary content item. In other embodiments, the playback timeline may be divided into a number of equal portions, or chapters, of the media content. In such embodiments, one secondary content indicator may be displayed per chapter, and each indicator may be displayed in the center of each portion of the timeline.

The content presentation system 101 may be configured to display the corresponding secondary content when the current playback indicator 202 reaches a time of the media content corresponding to a particular secondary content indicator 203-207 displayed on the playback timeline. Alternatively, the content presentation system 101 may be configured to display secondary content when a user selects a particular corresponding secondary content indicator displayed on the playback timeline. The interface may also include various control items 208 (discussed further herein) for varying or filtering the secondary content indicators, generating new secondary content to be related to the media content, searching for content including secondary content, and additional functionality with respect to the media content.

Figure 3A:
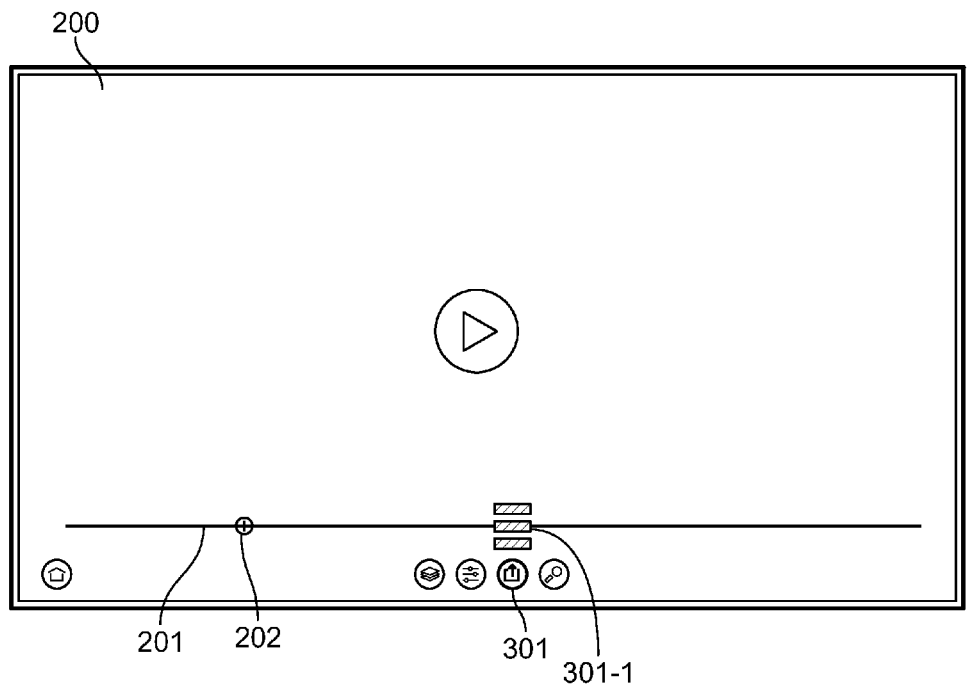
FIGS. 3(A) and 3(B) are illustrations of user interfaces for generating secondary content according to an embodiment of the present invention.

Referring now to FIG. 3(A), an illustration of an example of a user interface for generating secondary content rendered by a client according to an embodiment of the present disclosure is shown. During playback of the media content 200, a playback timeline 201 and current playback indicator 202 may be provided by the content presentation system 101 to the client, as previously discussed. If the user viewing the media content wishes to generate social media information, such as a comment or a post, in relation to a particular point in the media content being viewed, the user may select control item 301 to cause a social media content interface to be generated and displayed by the client. The control item 301 may include various sub-items 301-1 corresponding to various options for generating secondary content. In some embodiments, each sub-item may correspond to a different social media application, or different secondary content medium. For example, sub-items 301-1 may allow a user to choose between generating social media content in FACEBOOK, TWITTER, or INSTAGRAM, or the sub-items may also allow the user to choose between uploading a photo, a video, or a text comment to be associated with the media content at the particular playback position corresponding to the current playback indicator 202.

Figure 3B:
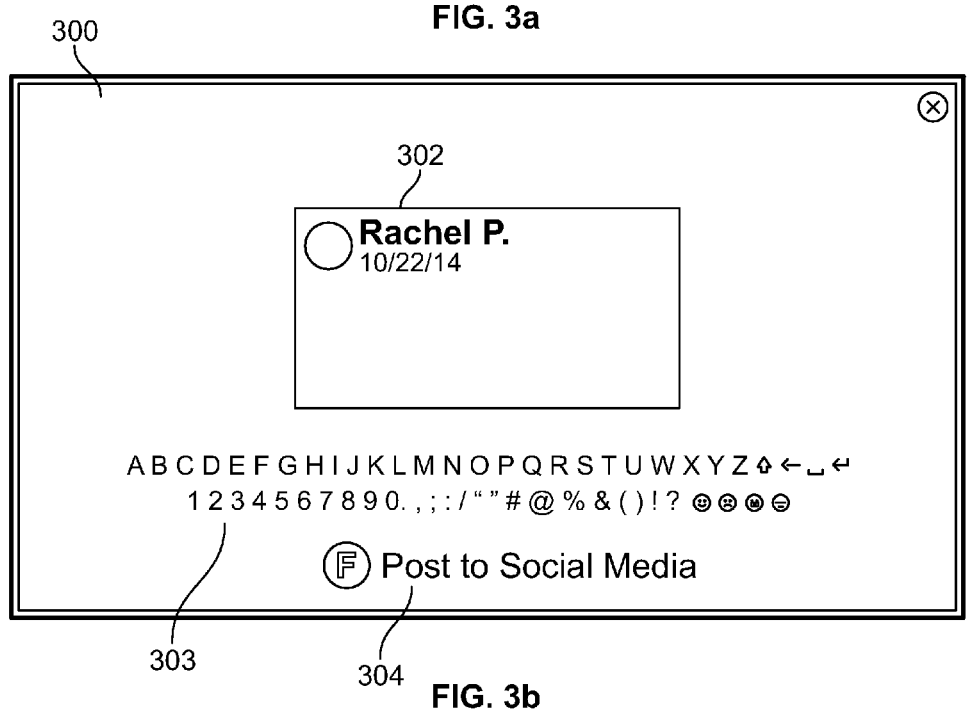

Referring now to FIG. 3(B), the content presentation system 101 may provide the client with a social media content generation interface 300, wherein the content created is associated with the particular timestamp corresponding to the current playback indicator when the user selected control item 301 to generate new secondary content. The content generation interface 300 may include information 302 about the user within the social media framework and the content to be created, including a user profile image, user name, and date associated with the generated content. The content generation interface 300 may include input functionality 303 to allow the user to input information using a non-keyboard device such as a remote control or mouse by moving a cursor around the displayed list of characters and selecting the next desired character. In other embodiments, the user may input the content information via a client device or peripheral, such as a tablet computer, computer keyboard, smartphone, touchscreen, and the like.

Once the user has completed inputting the social media information, the user may cause the input content to be transmitted via an input 304 and cause the input content to be uploaded to the third party database 108 and to the social media application framework. In some embodiments, the system 100 may also store the secondary content, or a copy of the secondary content created via the system 100 to be stored in the secondary content databases 104, 105, 106, or the secondary content may be stored in other memory, including local memory hardware, or memory connected via a network, such as cloud storage or servers. The stored secondary content may be stored with associated information, metadata, or identifiers including an identifier for the user generating the secondary content, an identifier for the user viewing the media content, the media content being viewed by the user at the time the secondary content was created, and a timestamp corresponding to the current playback position at the time the secondary content was created.

In some embodiments, the content receiver 103 may be configured to capture activity of a user via the interface and automatically generate information that can be stored or transmitted to the social media application framework. In one embodiment, a user can authorize various actions to be captured and stored or transmitted to the social media application and made available to other connected users. Thus, a user can authorize updates regarding his or her media content consumption, media content interests, viewing or browsing history, social media "likes" or "dislikes", to other connected users within the social media application framework. Accordingly, the content presentation system 101 may capture certain actions in a user interface related to, for example, the playing of the media content and generate a corresponding social media application information.

Figure 4:
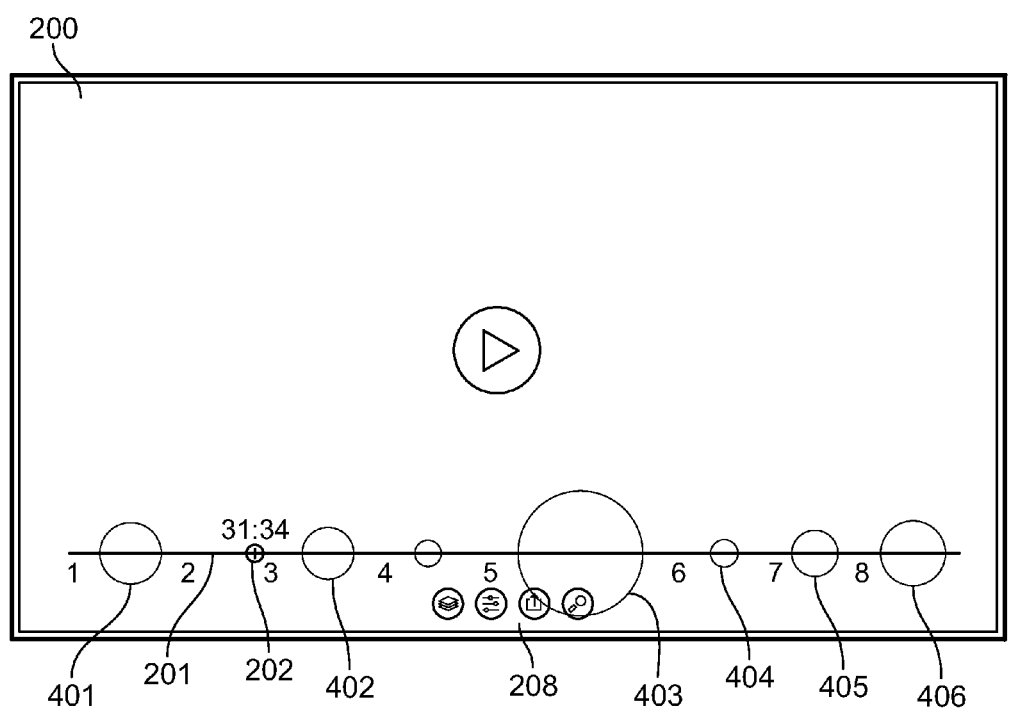
FIG. 4 is an illustration of a user interface for presenting media content in a networked environment according to an embodiment of the present invention.

FIG. 4 shows an illustration of an example of a user interface for presenting media content rendered by a client according to an embodiment of the present disclosure. As previously discussed, the interface may present the media content 200 being viewed by a user along with a playback timeline 201 and a current playback indicator 202 to show a current playback position, elapsed time, and remaining time in the media content presentation. Additionally, the content presentation system 101 may be configured to retrieve stored information of generated secondary content related to the media content being presented and generate secondary content indicators 401-406 for display by the client. As discussed, the secondary content may include various types of related content, including additional audio, video, images, or text content related to the media content being viewed by the user, such as behind the scenes clips, director commentary, captioning, alternate languages, deleted scenes, alternate scenes, character information, actor biography information, social media content, and the like.

For social media content, as discussed, the content presentation system 101 may obtain account and authentication information from the user who is viewing the media content in order to access information in a third party database via a social media application specific API. The content presentation system 101 may be configured to query the third party database for social media content that is associated with the particular media content being viewed by the user. Additionally, the social media content may be limited to the content generated by other users of the social media application to whom the particular user is connected to, or generated by users who have designated their content to be available publicly, as previously discussed. Alternatively, the content presentation system 101 may be configured to allow the user to designate certain selected other users of the social media application, and query the third party database for social media content which is associated with or generated by only those selected other users.

Based on the secondary content provided by secondary content databases and received from the third party database, the content presentation system 101 may generate information for the client to display secondary content indicators 401-406 on the playback timeline to indicate the position and the amount of secondary content available. For example, secondary content indicator 404 may be displayed by the client to indicate that a single item of secondary content related to the media content is available at the corresponding time position along the playback timeline. Secondary content indicator 405 may be displayed by the client to indicate that two items of secondary content related to the media content are available at the corresponding time position along the playback timeline, and secondary content indicator 406 may be displayed by the client to indicate that three items of secondary content related to the media content are available at the corresponding time position along the playback timeline. Thus, secondary content indicators such as 405 and 406 may provide visual indication to a viewer that multiple items of secondary content are available at a particular position along the playback timeline. The multiple items of secondary content may include various types of secondary content, as previously discussed, including additional audio, video, images, or text content related to the media content being viewed by the user, such as behind the scenes clips, director commentary, captioning, alternate languages, deleted scenes, alternate scenes, character information, actor biography information, uploaded images or videos, social media content, and the like. As previously discussed, the content presentation system 101 may provide instructions for displaying secondary content available at a particular position when the current playback position enters a time range corresponding to the secondary content indicator, or when the user selects the secondary content indicator.

The content presentation system 101 may generate instructions for displaying each secondary content indicator in a size to correspond to the number of secondary content items available at the corresponding position on the playback timeline. The secondary content indicator size may be increased with each additional item of secondary content available. However, in some embodiments a maximum size of the secondary content indicator may be set so as not to interfere with the viewing of the media content 200. For example, secondary content indicator 403 may be displayed to indicate that there are a particular number of secondary content items available at the corresponding time position. The secondary content indicator 403 may be displayed in increasing sizes until it reaches the maximum size, and thereafter the secondary content indicator 403 may be displayed in the same maximum size despite additional items of secondary content becoming available at the same time position.

Additionally, each secondary content indicator may be positioned to correspond to a particular range of time within the playback timeline, and the corresponding range of time may increase or decrease according to the displayed size of the secondary content indicator. For example, secondary content indicator 404 in the displayed size of FIG. 4 may correspond to a time range of one minute starting from 1:30:00 to 1:31:00. The time range may be based on a displayed size of the secondary content indicator. Accordingly, if another item of secondary content becomes available within the one minute range of 1:30:00 to 1:31:00, the size of secondary content indicator 404 may be increased such that the indicator now corresponds to a time range increased by one minute, for example 1:29:30 to 1:31:30.

In some embodiments, secondary content indicators may be merged to form increased size indicators where the corresponding time ranges of two indicators overlap by a threshold amount of time. For example, if another secondary content indicator corresponding to a time range of 1:32:00 to 1:33:00 is displayed next to indicator 404 as described above (corresponding to the time range of 1:30:00 to 1:31:00), the two indicators may overlap when the size of either or both indicators are increased due to additional secondary content. Accordingly, a threshold overlap amount may be set such that the indicators are displayed as separate indicators until the amount of overlap between the two indicators reaches the set threshold overlap amount. Thus in the above example, indicator 404 may be displayed as corresponding to a time range of 1:29:20 to 1:31:40 and the nearby secondary indicator may be displayed as corresponding to a time range of 1:31:30 to 1:33:30, where the threshold overlap amount is set to 20 seconds, as an example. As the two secondary content indicators are increased due to additional secondary items becoming available, the content presentation system 101 may provide instructions for displaying a single secondary content indicator to represent all secondary content items originally corresponding to the secondary content indicator 404 and the nearby indicator.

The new combined indicator may be positioned by determining a center point corresponding to an average of all timestamps of the secondary content represented by the indicators. In other embodiments, the combined indicator may be positioned about a center point determined by a median of the timestamp indicators. In other words the center point of the combed indicator may be set to a middle point between the left most timestamp and right most timestamp of the group of secondary content items. In yet other embodiments, the playback timeline may be divided in equal portions, or chapters, and each combined secondary content indicator may be centered within each portion, to indicate that secondary content is available at some point within the designated chapter.

Figure 5:
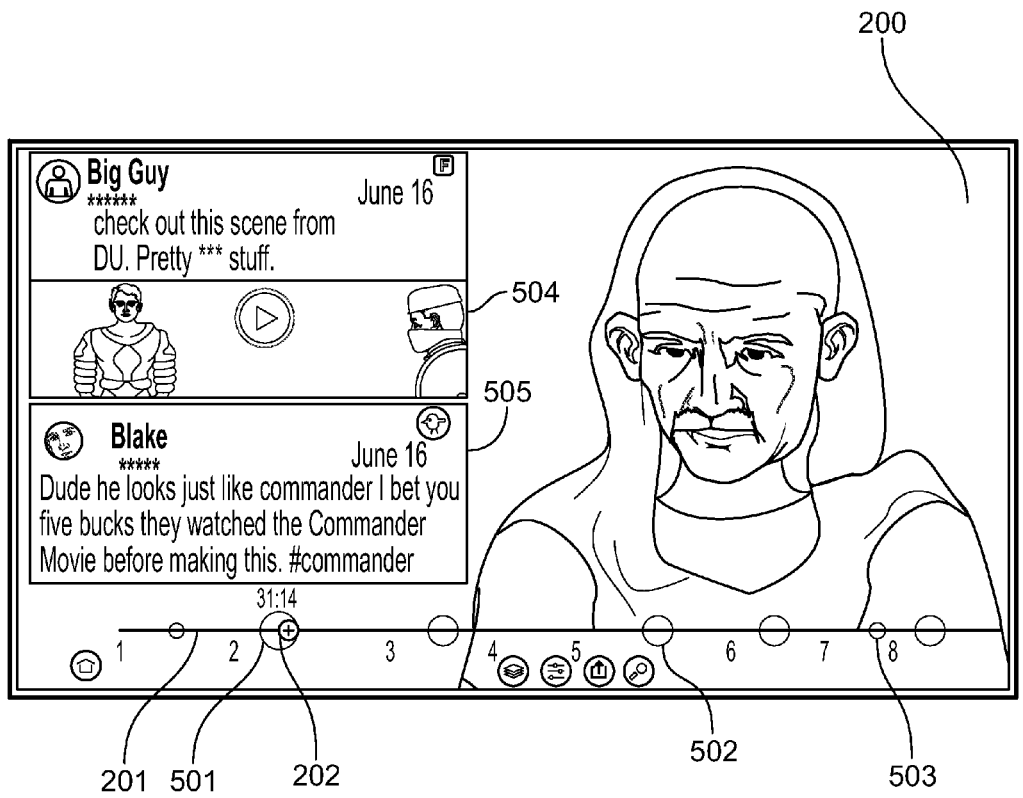
FIG. 5 is an illustration of a user interface for presenting secondary content according to an embodiment of the present disclosure.

Referring now to FIG. 5, an illustration of an example of a user interface for presenting secondary content rendered by a client according to an embodiment of the present disclosure is depicted. While a user is viewing the media content 200, the current playback indicator 202 is displayed to progress along the playback timeline 201. As previously discussed, secondary content indicators are displayed along the playback timeline representing secondary content items that are available at the corresponding time positions. As the current playback indicator reaches a time region corresponding to secondary content indicator 501, the secondary content items 504, 505 corresponding to the indicator may be displayed to the user on the interface. The secondary content may be displayed to the user in a region of the display so as not to interfere with the presentation of the media content 200. In other embodiments, the media content may be automatically paused when secondary content is displayed on the display. In some embodiments, the media content may be resumed after a certain amount of time, after which the secondary content is no longer displayed.

In the example shown in FIG. 5, secondary content indicator 501 is displayed to indicate that two secondary content items 504, 505 are available at the corresponding position. Accordingly, the secondary content indicator 501 is displayed in a size larger than secondary indicator 502 which is displayed to indicate that one secondary content item is available at that time point. The secondary content items 504, 505 may be both displayed at the same time when the current playback indicator 202 enters the time region corresponding to the indicator 501. Alternatively, each secondary content item may be displayed according to its corresponding timestamp within the time region represented by the indicator 501. When the current playback indicator 202 leaves the time range corresponding to the indicator, or when the current playback indicator 202 passes a particular time point corresponding to a secondary content item, or in response to an input command by the user, the secondary content 504, 505 may be removed from the display to the user.

As shown in the example of FIG. 5, a displayed secondary content item may include additional media, such as video 504. If a user selects the secondary content video 504 for viewing, the content presentation system 101 may provide instructions to automatically pause the media content 200 for the user to view the secondary content video. In some embodiments, the secondary content video 504 may be displayed to fill the entire display by replacing the media content 200. Once the secondary content video 504 has concluded, the media content 200 may be returned to fill the entire display. In some embodiments, a user may select secondary content 504, 505 to take further action on the item, such as submitting a response, inserting a comment, playing or displaying the media included in the secondary content, deleting the secondary content, moving the secondary content to another time point, sending the secondary content to another user, and the like. In other embodiments, secondary content items 504, 505 may include only a preview of the full secondary content. The full secondary content may be displayed or displayed in a larger size in response to a selection by the user. In some embodiments, in response to a selection of a preview image of a secondary content item 504, 505, content presentation system 101 generates instructions to pause the playback of the media content 200.

Figure 6A:
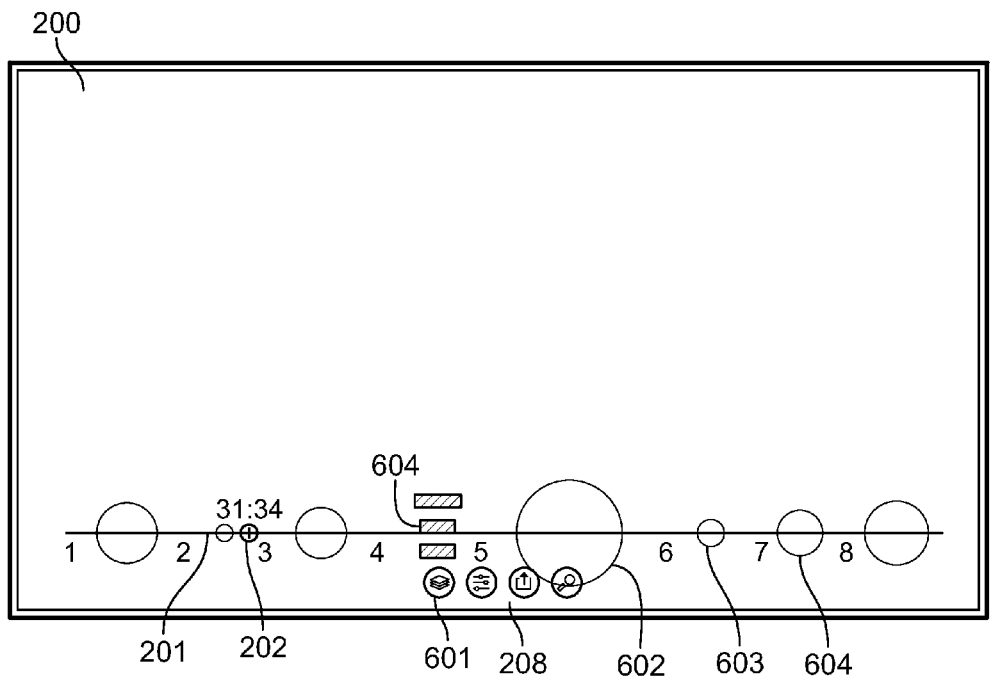
FIGS. 6(A) and 6(B) are illustrations of a user interface for presenting secondary content according to another embodiment of the present disclosure.
Figure 6B:
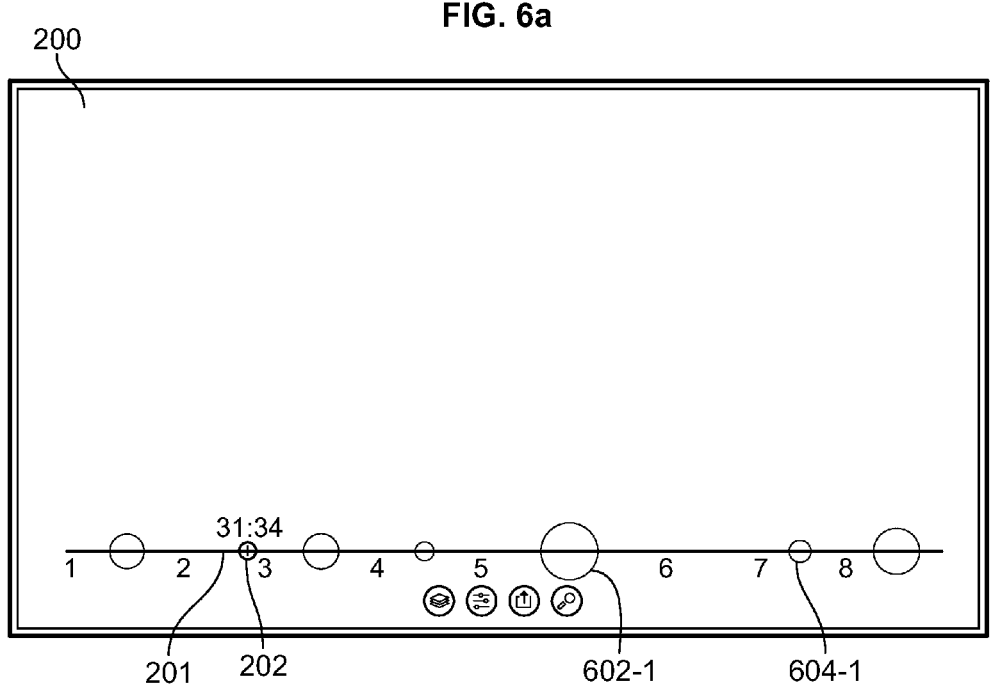

Referring now to FIGS. 6(A) and 6(B), illustrations of an example of a user interface for displaying secondary content rendered by a client according to an embodiment of the present disclosure is depicted. As shown in FIG. 6(A) and previously discussed, the media content 200 is displayed with a current playback indicator 202 progressing along a playback timeline 201 which includes secondary content indicators such as 602, 603, 604 to indicate the availability of secondary content at the corresponding time points. As discussed, the interface may also include various control items 208 for varying or filtering the secondary content indicators, generating new secondary content to be related to the media content, searching for content including secondary content, and additional functionality with respect to the media content. Among the control items 208, a filter control 601 may be provided for the user to control the types of indicators which are displayed on the playback timeline. Additionally, by controlling the display of the types of indicators, the user may control the types of secondary content which are displayed during the viewing of the media content 200.

For example, the playback timeline 201 may include secondary content indicator 602 which represents the existence of three types of secondary content at the corresponding time point: three items related to social media, one item related to behind the scenes video content, and one item related to a deleted scenes video from the particular point in the media content 200. Additionally, secondary content indicator 603 may represent one deleted scene video from the corresponding time point of indicator 603, and 604 may represent one deleted scene video and one social media comment at the corresponding time point of indicator 604. Filter control 601 may be provided to allow the user to select the types of secondary content that should be displayed to the user while the media content 200 is being viewed, and accordingly the secondary indicators to be displayed on the progress timeline 201. Thus, when the user selects filter control 601 and selects or de-selects various filter options 604 within the filter control 601, secondary content indicators may be additionally displayed or removed from the display.

In furtherance of the above example, if the user selects only social media information in the filter options 604 as secondary content type that should be displayed, secondary indicator 603 may be removed from the display completely as shown in FIG. 6(B) since the indicator 603 only represented one deleted scenes video item. Similarly, since the indicator 602 of FIG. 6(A) represented secondary content including a deleted scene and behind the scenes video content, the user's selection of only the social media content results in the size of the indicator 602-1 of FIG. 6(B) being decreased to indicate that only three secondary content items (the three items of social media content) are available at that particular time point, as shown in FIG. 6(B). Similarly, the size of the indicator 604-1 is decreased to indicate that only one secondary content item (one social media comment) is available at the corresponding time point in FIG. 6(B). Accordingly, various secondary content indicators may be added, removed, increased in size, or decreased in size in response to a user's selection or de-selection, as shown in FIG. 6(B).

Figure 7A:
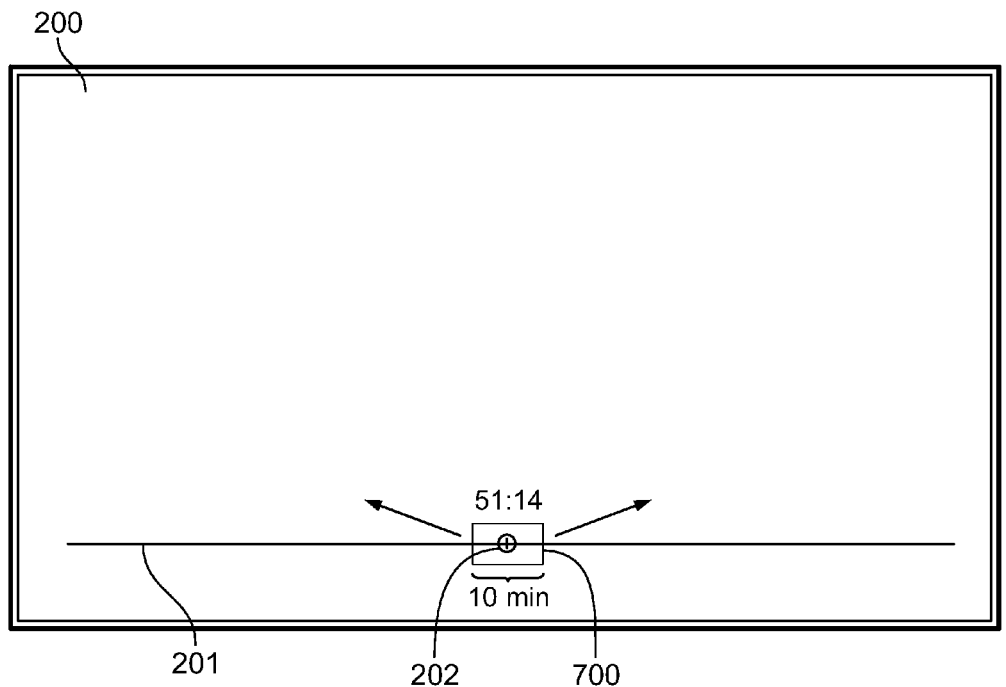
FIGS. 7(A) and 7(B) are illustrations of a user interface for presenting secondary content according to another embodiment of the present disclosure.
Figure 7B:
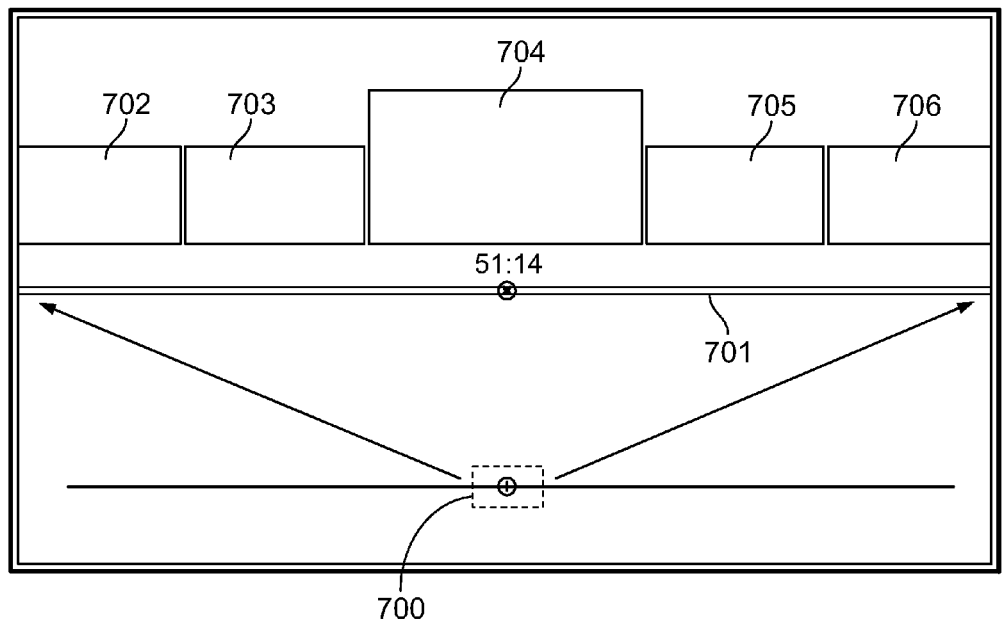

In addition to the examples discussed herein, various embodiments of the present disclosure include a content presentation system 101 capable of providing information for displaying an interface according to an input command of a viewing user. For example, in some embodiments, the user may zoom-in or zoom-out of the playback timeline in order to view the secondary content indicators, move the playback timeline to various regions of the display to optimize viewing of the media content, or other controls to alter the display of the secondary content and related interfaces. An example of zooming in on a portion of the playback timeline is shown in FIGS. 7(A) and 7(B).

When the timeline is zoomed-in to a particular portion 700 of the playback timeline, the secondary content indicators may be individually displayed (not depicted) such that any combined indicators are separated and each secondary content item is represented by a single displayed indicator on the zoomed-in playback timeline 701. In such a configuration, the user may be able to identify each secondary content item individually on the zoomed-in timeline 701. In some embodiments, the content presentation system 101 may also be configured to generate instructions for displaying a preview 702-706 of each secondary content item. Accordingly, each individually displayed secondary content indicator on the zoomed-in timeline (not depicted) may be displayed to correspond to a preview image. The user may then easily browse through all secondary content items and select particular items to view in detail without having to select each secondary content indicator displayed on the default configuration playback timeline, as shown in previous examples. The user may access zoomed-in or zoomed-out views of the timeline by inputting a selection via the input device as previously discussed. For example, while viewing the media content 200, the user may select a down arrow button via an input device, which displays a zoomed-in timeline from the bottom of the screen. Thereafter the user may browse through various levels of content and navigational functions by inputting various controls via the input device.

Figure 8:
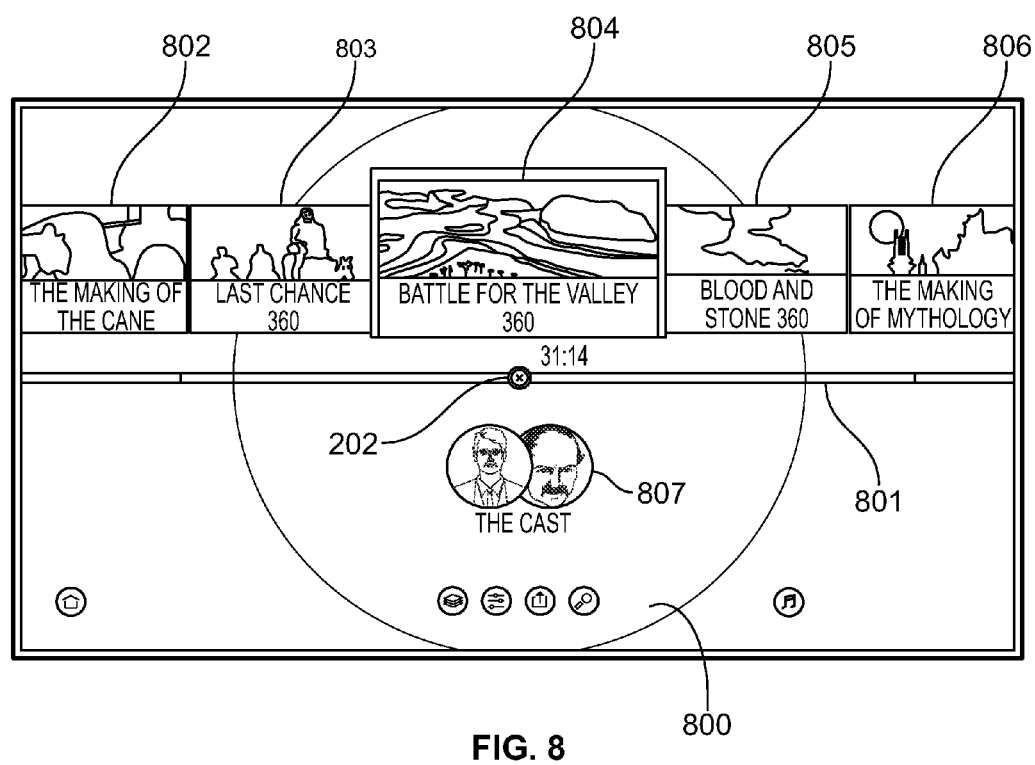
FIG. 8 is an illustration of a user interface for presenting secondary content according to another embodiment of the present disclosure.

FIG. 8 is another example of an embodiment of the present disclosure, showing another screen 800 of a zoomed-in view of a secondary content indicator. FIG. 8 depicts a view zoomed into a secondary content indicator 800 displayed on the playback timeline of media content. The secondary content indicator 800 may be displayed in a zoomed-in size, and the size may be varied depending on the number of secondary content items associated with the indicator, as previously discussed. When the screen is zoomed into the secondary content indicator 800, preview images of the secondary content associated with the indicator may be displayed, for example, at thumbnail images 802-806, 807. The screen may be divided into a number of preview rows appearing above and below the zoomed-in playback timeline 801 to indicate different categories of secondary content.

For example in FIG. 8, the row above the playback timeline 801 may show preview images for secondary content items which belong to the categories of background information, social media, and deleted scenes. In some embodiments, the screen may be configured to display all secondary content items in the order in which they appear on the playback timeline, regardless of whether they are associated with the currently zoomed-in secondary indicator 800. For example, preview images of secondary content items 803, 804, 805 may be associated with the zoomed-in secondary content indicator 800, as previously discussed. The screen may also display preview images for secondary content items 802 and 806 which are not associated with secondary indicator 800, but that are associated with secondary content indicators which appear before and after indicator 800. Thus, when a user navigates through the preview images of secondary content items 802-806, the zoomed-in screen may be configured to jump to a zoomed-in view of the next secondary content indicator following the currently displayed indicator 800. The screen may display a transition to a view of the next secondary content indicator when the user navigates from preview image 805, associated with the current indicator 800, to preview image 806, associated with the next indicator. Similarly, a transition is shown to a view of the previous secondary content indicator when the user navigates from preview image 803 to preview image 802. Thus, the user is able to navigate through the secondary content based on the items of secondary content available on the playback timeline.

As shown in FIG. 8, the row below the zoomed-in playback timeline 801 may contain preview images of secondary content belonging to a different category, such as cast and character information. For example, at secondary indicator 800, the preview image 807 may be displayed to indicate information on the cast and characters which appear in a scene associated with the particular point on the playback timeline. Multiple preview images may be displayed on the row and may be navigable by the user similar to the embodiment discussed above with respect to preview images 802-806. Other embodiments may include additional rows associated with other categories of secondary content, where one row may be associated with one or more categories, such that the user is able to navigate through the secondary content items available. Alternatively, the current playback indicator 202 may be manipulated by the user to scroll or navigate through the preview images of secondary content to select an item to view. Thus, the screen may be configured such that the user is able to select a navigation row with an input such as an up arrow command or a down arrow command, where the selected row will be navigated in response to inputs, such as a left arrow command or right arrow command.

Figure 9:
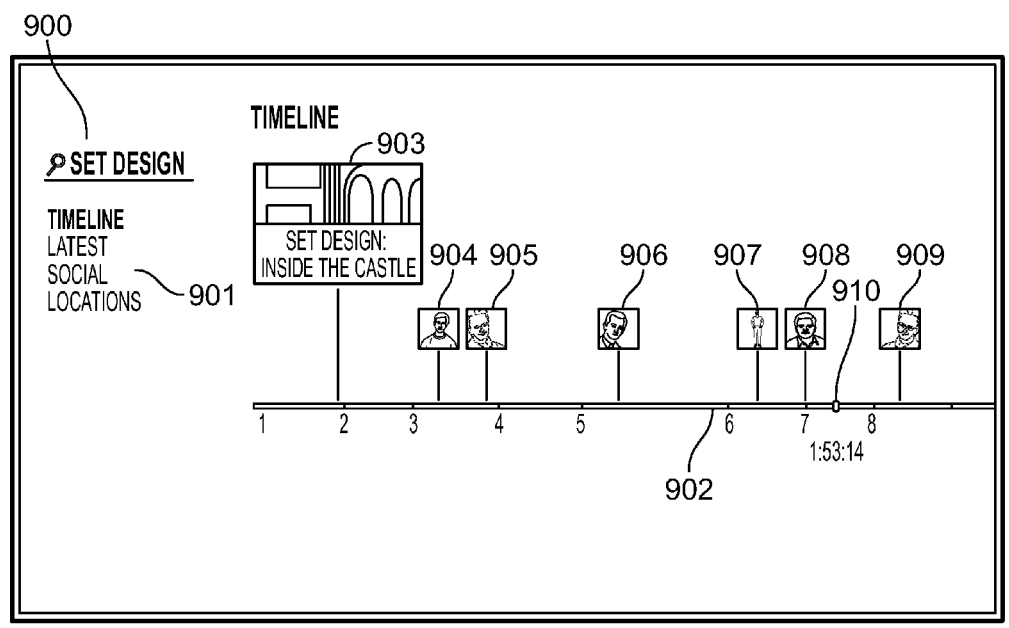
FIG. 9 is an illustration of a user interface for presenting search results of secondary content according to an embodiment of the present disclosure.

Additionally, the content presentation system 101, the content receiver 103, or both may be configured to provide search functionality for a particular item of secondary content. As shown in FIG. 9, the results of a search may be displayed to a user in the form of preview images along a timeline 902. In a search interface according to the present invention, the user may enter a search value in a search field 900 the form of text or other characters. The user may also set a number of search filters or conditions using filter controls 901. The filter controls 901 may be used to adjust the types of search results returned to the user, particular locations or times along the playback timeline to perform the search, or other conditions to control various aspects of the search or search results.

After performing the requested search, the user interface may be configured to display relevant search results visually along a timeline representative of the media content. For example, a search for "Set design" may return search results 903-909, each representing a secondary media content item associated with content related to set design. The search text "set design" may appear in a title of the secondary content item or in a metadata tag assigned to the secondary content item. Alternatively, in some embodiments, a secondary content item may be returned as a search result due to the word "set design" appearing somewhere within the secondary content, detected by content recognition functionality such as voice recognition, text recognition, and the like.

The search interface may display each search result along a timeline representation of the media content. For example, search result 903 may be displayed as a preview image with an indicator to show an association with a corresponding timestamp along the timeline 902. The interface may further allow the user to navigate through the search results by displaying the currently selected search result in a larger size, as shown at 903, than the remaining number of search results, shown at 904-909. As the user navigates to search result 904, the previously selected search result 903 may be displayed in a smaller size, and search result 904 may then be displayed in the selected larger size. Alternatively, in some embodiments, the size of each preview image may be based on the corresponding secondary content item's relevance to the user's search. In this example, the search interface may indicate that secondary content item 903 is most relevant to the search for "set design," and accordingly display preview image 903 in a larger size than the remaining less relevant search results 904-909.

The playback timeline 902 may also display the current playback indicator 910 of the media content to provide an indication to the user where the user's current viewing position is with respect to the search results. Thus, the search results interface may provide quick information at a glance regarding which search results may be most relevant to the user's specific search and media content viewing position.

The search results timeline 902 may also be configured to display the search results in various configurations, including diving the search results interface into a number of rows for displaying preview images of search results above and below the timeline 902, as previously discussed with respect to FIG. 8. For example, if the search filter controls 901 are set to search within the "Timeline" and "Social" content for the search text, the search results related to "Timeline" may be displayed in a defined row above the timeline 902, and the search results related to "Social" may be displayed in a defined row below the timeline 902.

Figure 10:
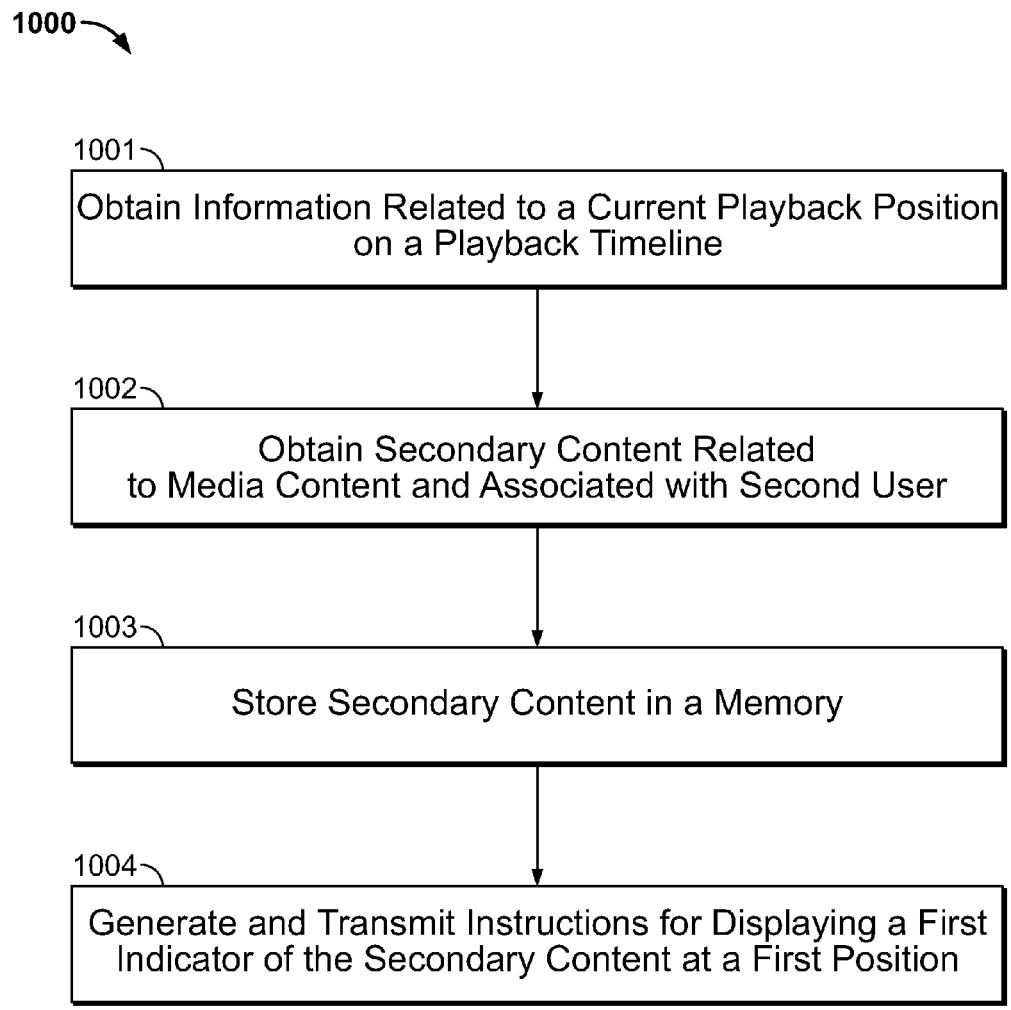
FIG. 10 is a diagram of a flowchart for presenting media content with dynamic secondary content according to an embodiment of the present invention

FIG. 10 is a flowchart diagram corresponding to a method 1000 of presenting media content with secondary content according to an embodiment of the present disclosure. The method includes providing information for displaying a current playback position on a playback timeline of the media content to the first user at block 1001. Block 1002 shows the operation of obtaining secondary content related to the media content and associated with a second user, wherein the first user and second user are associated according to a third party database, and block 1003 shows the operation of storing the obtained secondary content in a memory. The method 800 further includes the operation at block 1004 of generating and transmitting instructions for displaying a first indicator of the secondary content at a first position on the playback timeline to the first user, wherein the first position corresponds to a first timestamp associated with the secondary content.

According to embodiments of the present invention, a system for presenting media content with dynamic secondary content may include a content presentation system configured to provide media content for display to a first user, wherein the media content is received from a content distribution system, or the like. The content presentation system may be further configured to provide information to a client for displaying a playback position indicator on a playback timeline, and obtain secondary content related to the media content, wherein the secondary content is associated with a second user, wherein the first user and second user are associated according to a third party database. The content presentation system may be further configured to store the secondary content in a memory, and in some embodiments may store additional metadata or identifying information to be associated with the stored secondary content. The memory for storing secondary content may include local memory or networked storage, including cloud storage. Additionally, the content presentation system may further be configured to generate and transmit instructions for displaying a first indicator of the secondary content at a first position on the playback timeline to the first user, wherein the first position corresponds to a first timestamp associated with the secondary content.

It will be understood by those of ordinary skill in the art that in certain embodiments, the content presentation system includes at least one processor circuit, for example, having a processor and a memory. To this end, the content presentation system may comprise, for example, at least one server computer or like device. Stored in the memory may be both data and several components that are executable by the processor. In particular, stored in the memory and executable by the processor are applications related to receiving, collecting, storing, generating, transmitting, information and instructions related to displaying the media content. Also stored in the memory may be a data store and other data. In addition, an operating system may be stored in the memory and executable by the processor.

It is understood that there may be other applications that are stored in the memory and are executable by the processor as can be appreciated. For a software implementation, certain embodiments described herein may be implemented with separate software modules, such as procedures and functions, each of which perform one or more of the functions and operations described herein. The software code can be implemented with a software application stored in memory and executed by a controller or processor written in any suitable programming language, such as, for example, C, C++, C#, Objective C, Java®, JavaScript®, Perl, PHP, Visual Basic®, Python®, Ruby, Delphi®, Flash®, or other programming languages.

A number of software components may be stored in the memory and executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that maybe expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc, floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device. Also, the processor may include multiple processors and the memory may include multiple memory modules that operate in parallel processing circuits, respectively.

Various embodiments of the content presentation system and all other related systems described herein may be implemented in a computer-readable non-transitory medium, a machine-readable medium, or similar medium using, for example, software, hardware, or any combination thereof. For a hardware implementation, the embodiments of various systems described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

The various devices, modules, terminals, systems, and the like discussed herein may be implemented on a computer by execution of software comprising machine instructions read from computer-readable non-transitory medium. These hardware aspects may further include an input/output interface, graphical user interface, or other input/output means to allow the input/output of information related to controlling functions, inputting information, outputting information, receiving information, or transmitting information. The hardware aspects may further include circuitry, wired and wireless networking hardware, and hardware connectivity configurations to enable to various computers, processors, memory, interfaces, and the like to communicate, transmit, receive, and otherwise exchange information with each other, and with external or third party sources, such as the Internet. In certain embodiments, several hardware aspects may be implemented using a single computer, in other embodiments multiple computers, input/output systems, and hardware components may be used to implement the system.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of presenting media with dynamic content to a first user, the method comprising:
    obtaining information related to a current playback position on a playback timeline of the media being presented to the first user;
    obtaining secondary content related to the media and associated with a second user and storing the obtained secondary content in a memory, wherein the first user and second user are associated according to a third party database;

generating and transmitting instructions for displaying a first indicator of the secondary content at a first position on the playback timeline to the first user, wherein the first position corresponds to a first timestamp associated with the secondary content;

obtaining additional secondary content related to the media and associated with a third user and storing the additional secondary content in the memory, wherein the first user and third user are associated according to the third party database;

generating and transmitting instructions for increasing a size of the first indicator when a difference between the first timestamp and a second timestamp associated with the additional secondary content is less than or equal to a threshold length of time;

receiving a signal indicating a selection of the displayed first indicator; and generating and transmitting instructions for displaying the secondary content associated with the displayed first indicator;

wherein the third party database is a social media application database and the secondary content includes social media content associated with the second user.

2. The method of claim 1, wherein the selection comprises the current playback position entering a time range on the playback timeline corresponding to the first position.

3. The method of claim 1, wherein the first time stamp corresponds to a playback position of the media when the second user created the secondary content while the media was being presented to the second user.

4. The method of claim 1, further comprising:
receiving a zoom input for zooming-in to the playback timeline; and
generating and transmitting instructions for displaying a preview of the secondary content to correspond to the first indicator at a zoomed-in portion of the playback timeline.

5. The method of claim 1, further comprising:
obtaining another secondary content related to the media and associated with the third user;
storing the another secondary content in a memory; and
generating and transmitting instructions for displaying a second indicator of the another secondary content at a second position on the playback timeline to the first user;
wherein the second position corresponds to a second timestamp associated with the secondary content.

6. The method of claim 1, further comprising:
receiving a zoom input for zooming-in to the playback timeline; and
generating and transmitting instructions for displaying a zoomed-in portion of the playback timeline, wherein separate indicators are displayed for the secondary content and the additional secondary content in the displayed zoomed-in portion.

7. The method of claim 6, further comprising:
generating and transmitting instructions for displaying a preview of the secondary content and a preview of the additional secondary content corresponding to the zoomed-in portion of the playback timeline.

8. The method of claim 1, further comprising:
assigning a specific category of a plurality of categories to the secondary content; and generating and transmitting instructions for no longer displaying the first indicator when a filter for displaying the specific category on the playback timeline is unselected.

9. The method of claim 1, further comprising receiving time code reference information related to the media, wherein the current playback position on a playback timeline is based on the received time code reference information.

10. A system for presenting media with dynamic content to a first user, the system comprising:
a memory configured to store information;
a communication module configured to receive and transmit information; and
at least one processor configured to:
obtain, via the communication module, information related to a current playback position on a playback timeline of the media being presented to the first user by a client;
obtain, via the communication module, secondary content related to the media and associated with a second user and cause the memory to store the obtained secondary content, wherein the first user and second user are associated according to a third party database;
generate instructions for displaying a first indicator of the secondary content at a first position on the playback timeline to the first user and transmit the instructions via the communication module, wherein the first position corresponds to a first timestamp associated with the secondary content;
obtain, via the communication module, additional secondary content related to the media and associated with a third user and cause the memory to store the additional secondary content, wherein the first user and third user are associated according to the third party database;
generate and transmit to the client instructions for increasing a size of the first indicator when a difference between the first timestamp and a second timestamp associated with the additional secondary content is less than or equal to a threshold length of time; and
receive, via the communication module, a signal indicating a selection of the displayed first indicator; and
generate and transmit to the client instructions for displaying the secondary content associated with the displayed first indicator,
wherein the third party database is a social media application database and the secondary content includes social media content associated with the second user.

11. The system of claim 10, wherein the first time stamp corresponds to a playback position of the media when the second user created the secondary content while the media was being presented to the second user.

12. The system of claim 10, wherein the processor is further configured to:
obtain, via the communication module, another secondary content related to the media and associated with the third user;
cause the memory to store the another secondary content; and
generate and transmit instructions for displaying a second indicator of the another secondary content at a second position on the playback timeline to the first user;
wherein the second position corresponds to a second timestamp associated with the another secondary content.

13. The system of claim 10, wherein the processor is further configured to receive time code reference information related to the media via the communication module, wherein the current playback position on a playback timeline is based on the received time code reference information.

14. A machine-readable non-transitory medium having stored thereon machine-executable instructions for:
   obtaining information related to a current playback position on a playback timeline to the first user;
   obtaining secondary content related to the media and associated with a second user and storing the obtained secondary content in a memory, wherein the first user and second user are associated according to a third party database;
   generating and transmitting instructions for displaying a first indicator of the secondary content at a first position on the playback timeline to the first user wherein the first position corresponds to a first timestamp associated with the secondary content;
   obtaining additional secondary content related to the media and associated with a third user and storing the additional secondary content in the memory, wherein the first user and third user are associated according to the third party database;
   generating and transmitting instructions for increasing a size of the first indicator when a difference between the first timestamp and a second timestamp associated with the additional secondary content is less than or equal to a threshold length of time;
   receiving a signal indicating a selection of the displayed first indicator; and
   generating and transmitting instructions for displaying the secondary content associated with the displayed first indicator,
   wherein the third party database is a social media application database and the secondary content includes social media content associated with the second user.

15. The machine-readable non-transitory medium of claim 14, wherein the selection comprises the current playback position entering a time range on the playback timeline corresponding to the first position.

16. The machine-readable non-transitory medium of claim 14, wherein the first time stamp corresponds to a playback position of the media when the second user created the secondary content while the media was being presented to the second user.

17. The machine-readable non-transitory medium of claim 14, further having stored thereon machine-executable instructions for:
   receiving a zoom input for zooming-in to the playback timeline; and
   generating and transmitting instructions for displaying a preview of the secondary content to correspond to the first indicator at a zoomed-in portion of the playback timeline.

18. The machine-readable non-transitory medium of claim 14, further having stored thereon machine-executable instructions for:
   obtaining another secondary content related to the media and associated with the third user;
   storing the another secondary content in a memory; and
   generating and transmitting instructions for displaying a second indicator of the another secondary content at a second position on the playback timeline to the first user;
   wherein the second position corresponds to a second timestamp associated with the another secondary content.

19. The machine-readable non-transitory medium of claim 14, further having stored thereon machine-executable instructions for:
   receiving a zoom input for zooming-in to the playback timeline; and
   generating and transmitting instructions for displaying a zoomed-in portion of the playback timeline, wherein separate indicators are displayed for the secondary content and the additional secondary content.

20. The machine-readable non-transitory medium of claim 19, further having stored thereon machine-executable instructions for:
   generating and transmitting instructions for displaying a preview of the secondary content and a preview of the additional secondary content corresponding to the zoomed-in portion of the playback timeline.

21. The machine-readable non-transitory medium of claim 14, further having stored thereon machine-executable instructions for:
   assigning a specific category of a plurality of categories to the secondary content; and
   generating and transmitting instructions for no longer displaying the first indicator when a filter for displaying the specific category on the playback timeline is unselected.

* * * * *